United States Patent
Kanada et al.

(10) Patent No.: US 6,999,276 B2
(45) Date of Patent: Feb. 14, 2006

(54) MAGNETIC HEAD WITH MAGNETIC POLE MINIMUM FE CONTENT DIFFERENCE AND FE CONTENT INCREASING TOWARD INTERFACE WITH GAP LAYER

(75) Inventors: Yoshihiro Kanada, Niigata-ken (JP); Hisayuki Yazawa, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 320 days.

(21) Appl. No.: 10/135,269

(22) Filed: Apr. 29, 2002

(65) Prior Publication Data

US 2002/0163759 A1 Nov. 7, 2002

(30) Foreign Application Priority Data

May 1, 2001 (JP) .................................... 2001-133985

(51) Int. Cl.
G11B 5/31 (2006.01)
G11B 5/23 (2006.01)

(52) U.S. Cl. .................................... 360/126; 360/119
(58) Field of Classification Search ................ 360/126, 360/317, 119
See application file for complete search history.

(56) References Cited

U.S. PATENT DOCUMENTS

2002/0008936 A1 * 1/2002 Kawasaki et al. .......... 360/126
2002/0071209 A1 * 6/2002 Watanabe et al. .......... 360/126

FOREIGN PATENT DOCUMENTS

| JP | 10-241125 | 9/1998 |
| JP | 2001-6931 | 1/2001 |
| JP | 2001-209915 | 8/2001 |

OTHER PUBLICATIONS

Copy of Office Action dated Jan. 11, 2005 for Japanese Patent Application No. 2001–133985.

* cited by examiner

Primary Examiner—Craig A. Renner
(74) Attorney, Agent, or Firm—Brinks Hofer Gilson & Lione

(57) ABSTRACT

A magnetic head includes an upper magnetic pole layer formed by electroplating in which the density of the impressed current is increased in stages every predetermined period of time. The upper magnetic pole layer contains at least 60 mass % of Fe. The difference between the maximum Fe content and the minimum Fe content of the upper magnetic pole layer within 0.3 $\mu$m from the interface with the gap layer is 6 mass % or less.

6 Claims, 11 Drawing Sheets

MAGNETIC HEAD WITH MAGNETIC POLE MINIMUM FE CONTENT DIFFERENCE AND FE CONTENT INCREASING TOWARD INTERFACE WITH GAP LAYER

BACKGROUND OF THE INVENTION

1. Field of the Invention

The present invention relates to writing magnetic heads, and particularly to a writing magnetic head having an increased saturation magnetic flux density in the vicinity of a gap layer and satisfying the requirements for high recording density.

2. Description of the Related Art

FIG. 18 is a front view of a known writing magnetic head. The magnetic head is a so-called inductive head Hw, which is disposed on a reading magnetic head Hr using, for example, a magnetoresistive effect.

The reading magnetic head Hr comprises a magnetic field-reading element 1. A lower shield layer 3 and an upper shield layer 4 are disposed on both surfaces of the magnetic field-reading element 1 each having a gap layer 2 between the respective shield layers 3 and 4 and the element 1. The magnetic field-reading element 1 is a magnetoresistive sensor M comprising a GMR element using a giant magnetoresistive effect, such as a spin-valve film, or an AMR element using an anisotropic magnetoresistive effect.

The length of the magnetic field-reading element 1 in the track width direction defines the track width Tr of the reading magnetic head Hr. The distance between the upper shield layer 4 and the lower shield layer 3 is H2.

The gap layer 2 is formed of an insulating material such as $Al_2O_3$ or $SiO_2$. The lower shield layer 3 and the upper shield layer 4 are formed of a soft magnetic material having a high magnetic permeability, such as a NiFe alloy (permalloy).

The inductive head Hw comprises an insulating layer 5 on the upper shield layer 4 which also serves as a lower core layer 4 as well as a shield layer.

The insulating layer 5 has a slit 5a having a predetermined length which is formed from the face (ABS face) opposing a recording medium in the height direction (the Y direction in the drawing).

The slit 5a is provided with a lower magnetic pole layer 6, a gap layer 7, and an upper magnetic pole layer 8 therein by plating. The lower magnetic pole layer 6 is magnetically coupled with the lower core layer 4. The lower magnetic pole layer 6, the gap layer 7, and the upper magnetic pole layer 8 form a magnetic pole P defining the track width Tw. The track width Tw is 1.0 μm or less and is preferably 0.8 μm or less.

The lower magnetic pole layer 6 and the upper magnetic pole layer 8 are formed of a magnetic material such as a NiFe alloy, and the gap layer 7 is formed of a nonmagnetic metal such as a NiP alloy.

An upper core layer 9 is formed of a magnetic material such as a NiFe alloy on the upper magnetic pole layer 8 by plating. The upper core layer 9 has a width larger than the track width Tw.

A coil layer (not shown) is spirally patterned on the insulating layer 5 extending in the height direction.

A writing current flowing in the coil layer induces a writing magnetic field to the lower core layer 4 and the upper core layer 9, and thus causes a leakage field between the lower magnetic pole layer 6 and the upper magnetic pole layer 8, which oppose each other separated by the gap layer 7. The leakage field serves to write magnetic signals on recording media such as hard disks.

The known magnetic head as shown in FIG. 18 has the lower magnetic pole layer 6 and the upper magnetic pole layer 8, which oppose each other separated by the gap layer 7, in the slit 5a. Thus, the leakage field generated between the upper magnetic pole layer 8 and the lower magnetic pole layer 6 can be limited to the track width Tw of 0.1 μm or less.

The magnetic pole P, which comprises the lower magnetic pole layer 6, the gap layer 7, and the upper magnetic pole layer 8, is formed by electroplating in a slit formed in a resist layer or the like having a width equivalent to or slightly larger than that of the slit 5a.

In order to increase recording density, the saturation magnetic flux density must be large in the vicinity of the gap layer 7. Accordingly, the lower magnetic pole layer 6 and the upper magnetic pole layer 8 are formed of a magnetic material having a Fe content of 60% or more.

However, such a magnetic material having a high Fe content causes dispersion of the composition thereof in the lower magnetic pole layer 6 and the upper magnetic pole layer 8 when the magnetic pole P has a track width of 1.0 μm or less.

FIG. 19 shows changes in the Fe content of the upper magnetic pole layer 8 formed of a NiFe alloy.

FIG. 19 shows the relationship between the distance from the under surface 8a of the upper magnetic pole layer 8 in the Z direction in the drawing and the Fe content of the interior of the upper magnetic pole layer 8.

FIG. 19 suggests that when the upper magnetic pole layer 8 is up to 300 nm away from the under surface 8a in the Z direction, the Fe content of the upper magnetic pole layer 8 changes in the range of 58 to 74 mass %.

The change in the composition of the upper magnetic pole layer 8 makes the saturation magnetic flux density unstable in the vicinity of the gap layer 7. As a result, it is difficult to improve the writing performance of the magnetic head while recording density is being increased.

SUMMARY OF THE INVENTION

Accordingly, an object of the present invention is to provide a magnetic head in which the dispersion of the composition of the upper and lower magnetic pole layers is reduced and which can improve the recording performance while the recording density is being increased.

The present invention is directed to a magnetic head including a lower core layer, an upper core layer, a coil layer for applying a writing magnetic field to the lower core layer and the upper core layer, and a magnetic pole disposed between the lower core layer and the upper core layer. The magnetic pole has a width in the track width direction smaller than that of the lower core layer and the upper core layer. The magnetic pole includes a lower magnetic pole layer adjoining the lower core layer, an upper magnetic pole layer adjoining the upper core layer, and a gap layer disposed between the lower magnetic pole layer and the upper magnetic pole layer. Alternatively, the magnetic pole includes an upper magnetic pole layer adjoining the upper core layer and a gap layer disposed between the upper magnetic pole layer and the lower core layer. At least one of the upper magnetic pole layer and the lower magnetic pole layer is formed of a soft magnetic material containing at least 60 mass % of Fe. The difference between the maximum Fe content and the minimum Fe content of the upper magnetic pole layer or the lower magnetic pole layer within 0.3 μm from the interface with the gap layer is 6 mass % or less.

Since the upper magnetic pole layer or the lower magnetic pole layer contains at least 60 mass % of Fe, the saturation magnetic flux density can be increased in the vicinity of the gap layer to concentrate the magnetic flux in the vicinity of the gap layer.

Since the difference between the maximum Fe content and the minimum Fe content of the upper magnetic pole layer or the lower magnetic pole layer within 0.3 μm from the interface with the gap layer is limited to 6 mass %, the saturation magnetic flux density in the vicinity of the gap layer can be stable and therefore the writing performance of the magnetic head can be improved while the recording density is being increased. The difference of the Fe contents of 6 mass % or less allows the change in saturation magnetic flux density to be limited to a small degree.

Preferably, the ratio of the height to the width in the track width direction of the end face of the magnetic pole opposing a recording medium is in the range of 3.1 to 40.0.

Preferably, the upper magnetic pole layer or the lower magnetic pole layer is formed of a soft magnetic material containing at least 70 mass % of Fe Preferably, the Fe content in a cross section of the upper magnetic pole layer or the lower magnetic pole layer increases towards the interface with the gap layer. Consequently, the amount of leakage flux generated in the vicinity of the gap layer is increased, and thus the magnetic head satisfies the requirement for high recording density.

The width in the track width direction of the end face of the magnetic pole opposing a recording medium may be in the range of 0.1 to 0.8 μm.

The upper magnetic pole layer or the lower magnetic pole layer may be formed of a soft magnetic material selected from the group consisting of NiFe, CoFe, FeCoNi, CoFeX, and FeNiX, wherein X represents at least one element selected from the group consisting of Pd, Ir, Rh, Ru, and Pt.

Preferably, the upper magnetic pole layer is formed of a soft magnetic material having a saturation magnetic flux density higher than that of the upper core layer.

The present invention is also directed to a magnetic head including a lower core layer, an upper core layer, a coil layer for applying a writing magnetic field to the lower core layer and the upper core layer, and a magnetic pole disposed between the lower core layer and the upper core layer. The magnetic pole has a width in the track width direction smaller than that of the lower core layer and the upper core layer. The magnetic pole includes a lower magnetic pole layer adjoining the lower core layer, an upper magnetic pole layer adjoining the upper core layer, and a gap layer disposed between the lower magnetic pole layer and the upper magnetic pole layer. Alternatively, the magnetic pole includes an upper magnetic pole layer adjoining the upper core layer and a gap layer disposed between the upper magnetic pole layer and the lower core layer. The upper magnetic pole layer includes at least a first magnetic sub layer adjoining the gap layer and a second magnetic sub layer. The first magnetic sub layer is formed of a soft magnetic material containing at least 60 mass % of Fe. The difference between the maximum Fe content and the minimum Fe content of the first magnetic sub layer within 0.3 μm from the interface with the gap layer is 6 mass % or less.

Preferably, the ratio of the height to the width in the track width direction of the end face of the magnetic pole opposing a recording medium is in the range of 3.1 to 40.0.

Preferably, the first magnetic sub layer is formed of a soft magnetic material having a saturation magnetic flux density higher than that of the other magnetic sub layers.

Since the magnetic sub layer adjoining the gap layer has a saturation magnetic flux density higher than that of the other magnetic sub layers, the amount of leakage flux generated in the vicinity of the gap layer can be increased, and thus the magnetic head satisfies the requirement for high recording density.

In the present invention, the upper magnetic pole layer may be formed by plating.

The present invention is also directed to a method for manufacturing a magnetic head having a lower core layer and an upper core layer separated by a gap layer and a coil layer for applying a writing magnetic field to the lower and upper core layers. The method includes the steps of (a) forming a lower core layer; (b) forming a plating layer having a slit extending in the height direction from a face opposing a recording medium; (c) forming a nonmagnetic gap layer in the slit by plating; (d) forming an upper magnetic pole layer on the gap layer in the slit by plating; and (e) forming an upper core layer magnetically coupled with the upper magnetic pole layer on the upper magnetic pole layer. At least the step (d) of the steps (c) and (d) is performed by electroplating in which the density of impressed current is increased in stages every predetermined period of time.

The density of the impressed current is set small in the vicinity of the bottom of the slit, where the plating composition is unstably supplied from a plating bath, so that the plating composition becomes uniform. Then, the density of the impressed current is gradually increased to increase plating speed. By increasing the density of the impressed current in stages every predetermined period of time, the upper magnetic pole layer having a uniform composition can be formed.

As a result, the vicinity of the gap layer can have a stable saturation magnetic flux density, and thus the writing performance of the magnetic head can be improved while the recording density is being increased.

Preferably, a pulsed current is used as the impressed current in the step (d). The density of the pulsed current is increased in stages every predetermined period of time.

In electroplating using a pulsed current, the current is intermittently applied by, for example, repeating on-off control by a current controlling device. By setting a pause time for applying no current, a NiFe alloy film can be gradually deposited, and further, the deviation of the current densities at plating can be alleviated in comparison with plating using a direct current even when the Fe ion concentration in the plating bath is increased.

Thus, the Fe content of the soft magnetic material forming an upper magnetic pole layer can be increased in comparison with plating using a direct current.

Preferably, the upper magnetic pole layer is formed of a soft magnetic material containing at least 60 mass % of Fe in the step (d). More preferably, the Fe content of the upper magnetic pole layer is 70 mass % or more.

The method for manufacturing the magnetic head may further include the step of (f) forming a lower magnetic pole layer by plating, between the steps (b) and (c). The upper magnetic pole layer, the gap layer, and the lower magnetic pole layer define a magnetic pole.

In the step (d), preferably, the upper magnetic pole layer is formed such that the ratio of the height to the width in the track width direction of the end face of the magnetic pole opposing a recording medium is in the range of 5.0 to 20.0.

The upper magnetic pole layer needs to have a large volume to rarely cause magnetic saturation. Accordingly, the upper magnetic pole layer is formed so as to be large in the height direction.

Since the upper magnetic pole layer is formed by electroplating in which the density of the impressed current is increased in stages every predetermined period of time, the upper magnetic pole layer can have a uniform soft magnetic composition.

The upper magnetic pole layer may be formed of a NiFe alloy by plating such that the difference between the maximum Fe content and the minimum Fe content thereof within 0.3 $\mu$m from the interface with the gap layer 20 is 6 mass % or less.

Preferably, the slit has a width in the range of 0.1 to 0.8 $\mu$m.

Preferably, the upper magnetic pole layer is formed such that the Fe content in a cross section of the upper magnetic pole layer increases towards the interface with the gap layer. For example, when the upper magnetic pole layer is formed by plating, the density of the impressed current is increased in stages every predetermined period of time to reduce the Fe supplying rate from the plating bath as the plated surface is moving away from the gap layer.

The upper magnetic pole layer may be formed of a soft magnetic material selected from the group consisting of NiFe, CoFe, FeCoNi, CoFeX, and FeNiX, wherein X represents at least one element selected from the group consisting of Pd, Ir, Rh, Ru, and Pt.

Preferably, the upper magnetic pole layer is formed of a soft magnetic material having a saturation magnetic flux density higher than that of the upper core layer.

DESCRIPTION OF THE PREFERRED EMBODIMENTS

Figure 1:
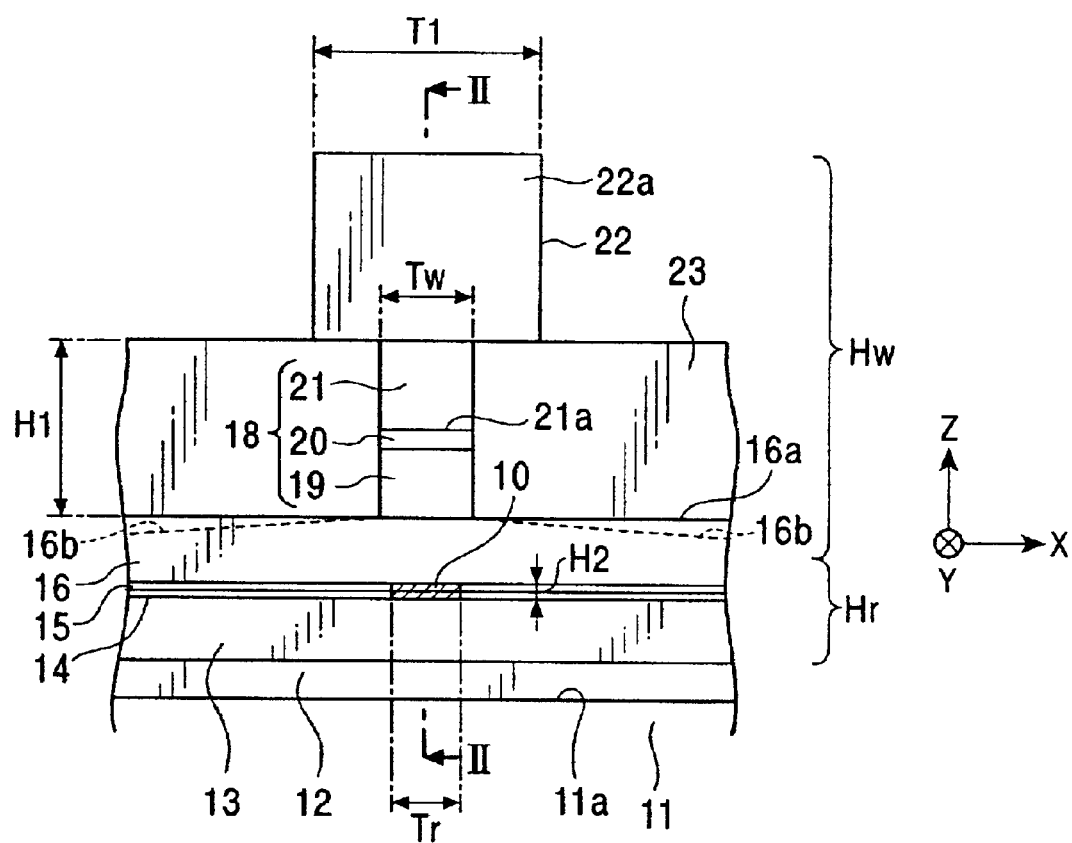
FIG. 1 is a fragmentary front view of a magnetic head according to a first embodiment of the present invention.
Figure 2:
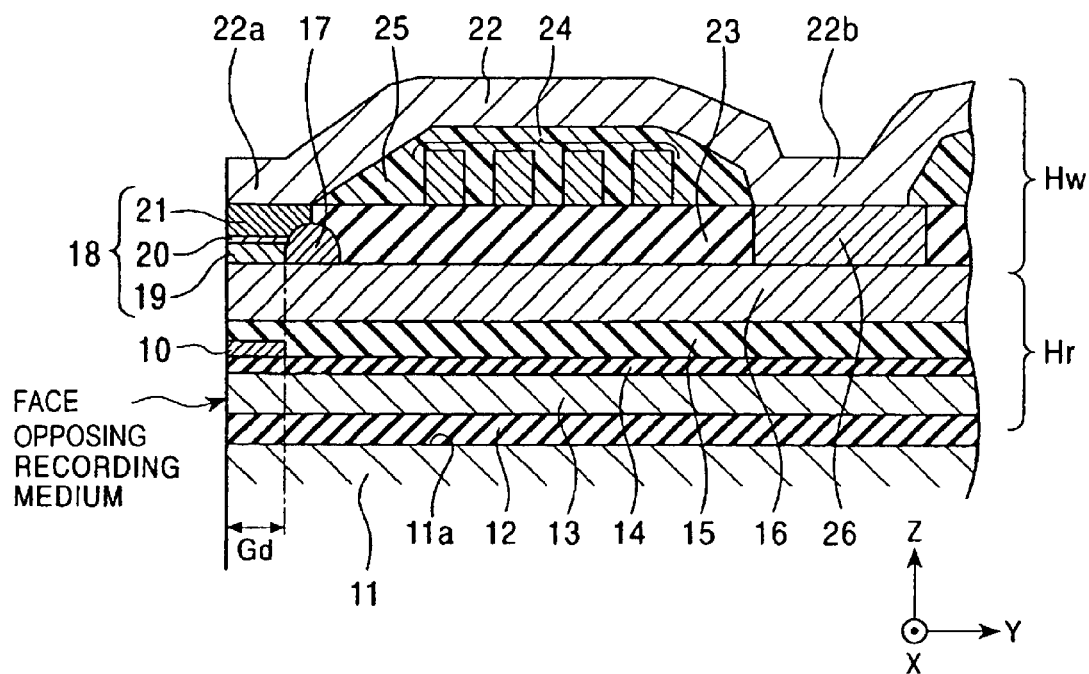
FIG. 2 is a longitudinal sectional view of the magnetic head shown in FIG. 1.

FIG. 1 is a front view of a magnetic head according to the present invention and FIG. 2 is a longitudinal sectional view taken along the line II—II of the magnetic head shown in FIG. 1. The magnetic head shown in FIG. 2 serves as a writing head Hw of the present invention which is a so-called inductive head Hw. The inductive head Hw is formed on a reading head Hr using, for example, a magnetoresistive effect.

The magnetic head shown in FIGS. 1 and 2 is formed on a trailing end face 11a of a ceramic slider 11 included in a floating head. The magnetic head is an integrated thin-film magnetic head comprising the reading head Hr and the writing inductive head Hw.

The reading magnetic head Hr is used to detect a leakage field from recording media, such as hard disks, using a magnetoresistive effect.

As shown in FIG. 2, a lower shield layer 13 is formed of a magnetic material such as a NiFe alloy on an $Al_2O_3$ film 12 on a trailing side face 11a of the slider 11. A lower gap layer 14 is formed of an insulating material on the lower shield layer 13.

The reading magnetic head Hr comprises a magnetic field-reading element 10, which is a magnetoresistive sensor comprising a GMR element using a giant magnetoresistive effect, such as a spin-valve film, a TMR element using a tunneling magnetoresistive effect, or an AMR element using an anisotropic magnetoresistive effect. The magnetic field-reading element 10 has the lower shield layer 13 and an upper shield layer 16 separated by the lower gap layer 14 and an upper gap layer 15, respectively, on both surfaces thereof.

The length of the magnetic field-reading element 10 in the track width direction (the X direction in the drawing) defines the track width of the reading magnetic head Hr. The distance between the lower shield layer 13 and the upper shield layer 16 is H2.

The lower and upper gap layers 14 and 15 are formed of an insulating material such as $Al_2O_3$ or $SiO_2$, and the lower and upper shield layers 13 and 16 are formed of a soft magnetic material having a high magnetic permeability such as a NiFe alloy (permalloy).

In FIGS. 1 and 2, the upper shield layer 16 serves as a lower core layer 16 of the inductive head Hw as well as a shield layer. A Gd defining layer 17 is formed on the lower core layer 16 to define the gap depth (Gd) which is a distance between the face opposing a recording medium and an end of the Gd defining layer 17, as shown in FIG. 2. The Gd defining layer 17 is formed of a nonmagnetic organic insulating resist, a nonmagnetic inorganic insulating material such as $SiO_2$ or $Al_2O_3$, a nonmagnetic conductive material such as Cu, or the like.

The inductive head Hw comprises an insulating layer 23 formed of an insulating material on the lower core layer 16. The insulating material comprises at least one substance selected from the group consisting of AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN. The insulating layer 23 may be a monolayer or a multilayer.

The magnetic pole 18 extends from the face opposing a recording medium to the Gd defining layer 17, as shown in FIG. 2.

The magnetic pole 18 is formed by depositing a lower magnetic pole layer 19, a nonmagnetic gap layer 20, and an upper magnetic pole layer 21 in that order upward.

The lower magnetic pole layer 19 is formed by directly plating the lower core layer 16. The gap layer 20 deposited on the lower magnetic pole layer 19 is preferably formed of a nonmagnetic metal capable of being plated, and is specifically formed of a metal selected from the group consisting of NiP, NiPd, NiPt, NiRh, NiW, NiMo, Au, Pt, Rh, Pd, Ru, Cr, Ag, and Cu. The gap layer 20 may be a monolayer or a multilayer.

In this embodiment of the present invention, the gap layer 20 is formed of NiP. Thus, the gap layer 20 can become adequately nonmagnetic.

The upper magnetic pole layer 21, which is formed on the gap layer 20, is magnetically coupled with an upper core layer 22 disposed on the upper magnetic pole layer 21.

By forming the gap layer 20 of a nonmagnetic metal capable of being plated, the lower magnetic pole layer 19, the gap layer 20, and the upper magnetic pole layer 21 can be consecutively formed by plating.

The magnetic pole 18 may be composed of two layers which are the gap layer 20 and the upper magnetic pole layer 21.

The width of the magnetic pole 18 in the track width direction (the X direction) is the track width Tw, as shown in FIG. 1.

The upper magnetic pole layer 21 and the lower magnetic pole layer 19 are formed of at least one soft magnetic material selected from the group consisting of NiFe, CoFe, FeCoNi, CoFeX, and FeNiX, wherein X is at least one element selected from the group consisting of Pd, Ir, Rh, Ru, and Pt.

The upper core layer 22 and the lower core layer 16 are formed of a NiFe alloy by plating.

The material of the upper core layer 22 and the upper magnetic pole layer 21 may be the same or different; the material of the lower core layer 16 and the lower magnetic pole layer 19 may be the same or different.

Preferably, the upper magnetic pole layer 21 is formed of a soft magnetic material having a saturation magnetic flux density higher than that of the upper core layer 22, and the lower magnetic pole layer 19 is formed of a soft magnetic material having a saturation magnetic flux density higher than that of the lower core layer 16.

The top surface of the lower core layer 16 may be a horizontal surface 16a or an inclined surface 16b gradually inclining from both starting edges of the magnetic pole 18 in the track width direction. The inclined surface 16b allows the upper core layer 22 and the lower core layer 16 to have a large distance from each other, and therefore, it can prevent of the generation of side fringing.

An insulating layer 23 is formed on both sides of the magnetic pole 18 in the track width direction (the X direction) and at the back of the magnetic pole 18 in the height direction (the Y direction), as shown in FIGS. 1 and 2. The top surface of the insulating layer 23 is aligned with the top surface of the magnetic pole 18.

A coil layer 24 is spirally patterned on the insulating layer 23 and is covered with the organic insulating layer 25, as shown in FIG. 2.

The upper core layer 22 is patterned from the top of the magnetic pole 18 to the top of the insulating layer 25 by, for example, frame plating, as shown in FIG. 2. The end 22a of the upper core layer 22 opposing to a recording medium has a width T1 in the track width direction, as shown FIG. 1, and the width T1 is larger than the track width Tw.

A base 22b of the upper core layer 22 is in contact with a connection layer (a back gap layer) 26 formed of a magnetic material on the lower core layer 16, as shown in FIG. 2.

A writing current flowing in the coil layer 24 induces a writing magnetic field to the lower core layer 16 and the upper core layer 22, and thus causes a leakage field between the lower magnetic pole layer 19 and the upper magnetic pole layer 21, which oppose each other having the gap layer 20 therebetween. The leakage field serves to write magnetic signals on recording media such as hard disks.

As described above, at least one of the upper magnetic pole layer 21 and the lower magnetic pole layer 19 is formed of a soft magnetic material selected from the group consisting of NiFe, CoFe, FeCoNi, CoFeX, and FeNiX, wherein X is an element selected from the group consisting of Pd, Ir, Rh, Ru, and Pt. In this embodiment of the present invention, the soft magnetic material contains at least 60 mass % of Fe, and preferably at least 70 mass % of Fe.

In the magnetic pole 18, the ratio of the height H1 to the width Tw in the track width direction of the end face opposing a recording medium is in the range of 3.1 to 40.1. The width Tw of the magnetic pole 18 in the track width direction is the same as the track width of the inductive head.

In the embodiment of the present invention, the height H1 of the end face opposing a recording medium is in the range of 2.5 to 4.0 $\mu$m. The track width Tw is in the range of 0.1 to 0.8 $\mu$m, and preferably in the range of 0.1 to 0.5 $\mu$m.

Since the upper magnetic pole layer 21 or the lower magnetic pole layer 19 contains at least 60 mass % of Fe, the saturation magnetic flux density becomes higher in the vicinity of the gap layer 20 and therefore the magnetic flux can be concentrated in the vicinity of the gap layer. Also, the magnetic pole 18 has a large height at the end face thereof opposing a recording medium, and accordingly, the track width Tw can be small.

In addition, the difference between the maximum Fe content and the minimum Fe content of the upper magnetic pole layer 21 or the lower magnetic pole layer 19 within 0.3 $\mu$m from the interface with the gap layer 20 is 6 mass % or less. This difference can be set at 5 mass % or less.

When the heights of the upper magnetic pole layer 21 and the lower magnetic pole layer 19 are 0.3 $\mu$m or less, the difference between the maximum Fe content and the minimum Fe content of the upper magnetic pole layer 21 or the lower magnetic pole layer 19 is 6 mass % or less.

Preferably, the difference between the maximum Fe content and the minimum Fe content of the upper magnetic pole layer 21 or the lower magnetic pole layer 19 within 0.5 $\mu$m from the interface with the gap layer 20 is 6 mass % or less.

More preferably, the difference between the maximum Fe content and the minimum Fe content within 1.0 μm from the interface with the gap layer 20 is 6 mass % or less. The difference of the Fe content of 6 mass % or less allows the change in the saturation magnetic flux density to be limited to, for example, 0.1 T or less.

By controlling the Fe content of the upper magnetic pole layer 21 or the lower magnetic pole layer 19, the saturation magnetic flux density can be stable, and therefore the writing performance of the magnetic head can be improved while the recording density is being increased.

The inductive head in which the change in the Fe content of the upper magnetic pole layer 21 or the lower magnetic pole layer 19 is small is prepared by a method which will be described later.

Figure 3:
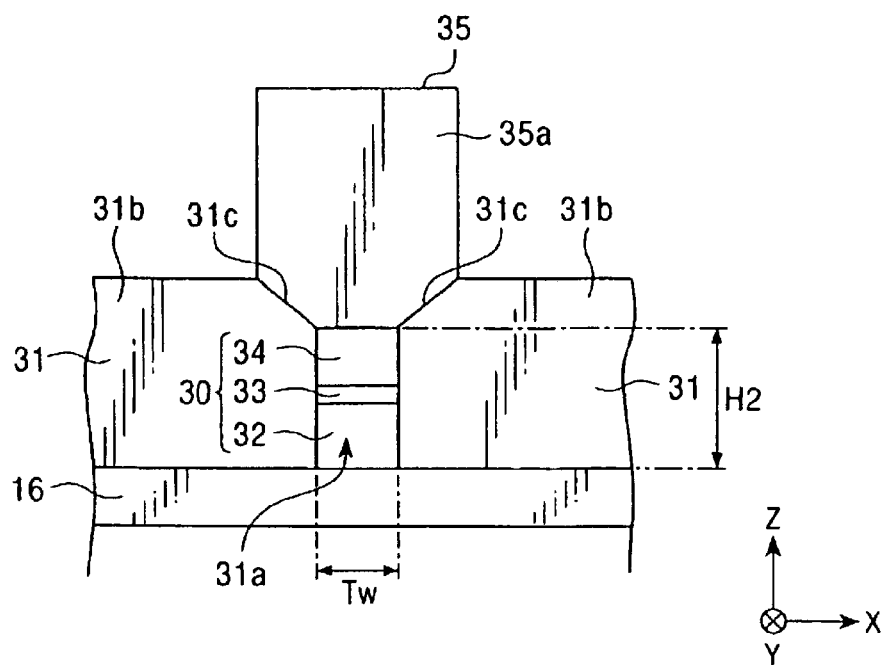
FIG. 3 is a fragmentary front view of a magnetic head according to a second embodiment of the present invention.

FIG. 3 shows a structure of an inductive head according to a second embodiment of the present invention.

As shown in FIG. 3, an insulating layer 31 is formed on the lower core layer 16. The insulating layer 31 is provided with a track-width-controlling slit 31a having a predetermined width in the height direction (the Y direction) from the face opposing a recording medium. The track-width-controlling slit 31a has a width Tw at the face opposing the recording medium, as shown in FIG. 3.

The track width Tw is in the range of 0.1 to 0.8 μm, and preferably of 0.1 to 0.5 μm.

The track-width-controlling slit 31a is provided with a lower magnetic pole layer 32, a nonmagnetic gap layer 33, and an upper magnetic pole layer 34, in that order, therein and thus a magnetic pole 30 is formed.

The lower magnetic pole layer 32 is formed by directly plating the lower core layer 16. The gap layer 33 on the lower magnetic pole layer 32 is preferably formed of a nonmagnetic metal capable of being plated. Specifically, the gap layer 33 is formed of a metal selected from the group consisting of NiP, NiPd, NiPt, NiRh, NiW, NiMo, Au, Pt, Rh, Pd, Ru, Cr, Ag, and Cu. The gap layer 33 may be a monolayer or a multilayer.

In this embodiment of the present invention, the gap layer 33 is formed of NiP. Thus, the gap layer 33 can become adequately nonmagnetic.

The magnetic pole 30 may be composed of two layers which are the gap layer 33 and the upper magnetic pole layer 34.

The upper magnetic pole layer 34 is magnetically coupled with an upper core layer 35 disposed on the upper magnetic pole layer 34.

By forming the gap layer 33 of a nonmagnetic metal capable of being plated, the lower magnetic pole layer 32, the gap layer 33, and the upper magnetic pole layer 34 can be consecutively formed by plating.

A coil layer (not shown) is spirally patterned on the insulating layer 31 in the height direction from the back of the track-width-controlling slit 31a.

As shown in FIG. 3, the insulating layer 31 has slopes 31c such that both sides of the track-width-controlling slit 31a in the track width direction (the x direction) diverge from the top of the upper magnetic pole layer 34 to the top surface 31b of the insulating layer 31.

An end 35a of the upper core layer 35 is formed from the top of the upper magnetic pole layer 34 along the slopes 31c in the directions retreating from the lower core layer 16. The slopes 31c allow the upper core layer 35 and the lower core layer 16 to have a large distance from each other, and therefore, it can prevent the generation of side fringing.

The upper magnetic pole layer 34 and the lower magnetic pole layer 32 are formed of at least one soft magnetic material selected from the group consisting of NiFe, CoFe, FeCoNi, CoFeX, and FeNiX, wherein X is at least one element selected from the group consisting of Pd, Ir, Rh, Ru, and Pt. In this embodiment of the present invention, the soft magnetic material contains at least 60 mass % of Fe, and preferably at least 70 mass % of Fe.

In the magnetic pole 30, the ratio of the height H2 to the width Tw in the track width direction of the end face opposing a recording medium is in the range of 3.1 to 40.0. The width Tw of the magnetic pole 30 in the track width direction is the same as the track width of the inductive head.

Since the upper magnetic pole layer 34 or the lower magnetic pole layer 32 contains at least 60 mass % of Fe, the saturation magnetic flux density becomes higher in the vicinity of the gap layer 33, and therefore, the magnetic flux can be concentrated in the vicinity of the gap layer 33. Also, the magnetic pole 30 has a large height at the end face thereof opposing a recording medium, and accordingly, the track width Tw can be small.

In addition, the difference between the maximum Fe content and the minimum Fe content of the upper magnetic pole layer 34 or the lower magnetic pole layer 32 within 0.3 μm from the interface with the gap layer 33 is 6 mass % or less.

When the heights of the upper magnetic pole layer 34 and the lower magnetic pole layer 32 are 0.3 μm or less, the difference between the maximum Fe content and the minimum Fe content of the upper magnetic pole layer 34 or the lower magnetic pole layer 32 is 6 mass % or less.

Preferably, the difference between the maximum Fe content and the minimum Fe content of the upper magnetic pole layer 34 or the lower magnetic pole layer 32 within 0.5 μm from the interface with the gap layer 33 is 6 mass % or less. More preferably, the difference between the maximum Fe content and the minimum Fe content within 1.0 μm from the interface with the gap layer 33 is 6 mass % or less.

Thus, the saturation magnetic flux density can be stable in the vicinity of the gap layer 33, and therefore, the recording performance of the magnetic head can be improved while recording density is being increased.

Figure 4:
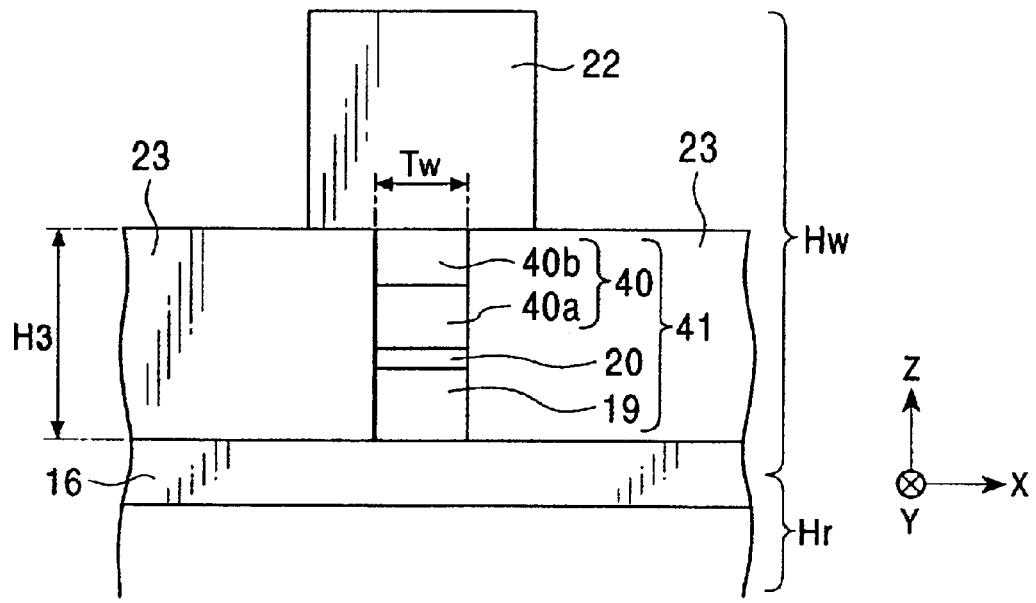
FIG. 4 is a fragmentary front view of a magnetic head according to a third embodiment of the present invention.

FIG. 4 shows a structure of an inductive head according to a third embodiment of the present invention.

The inductive head has the same structure as the inductive head shown in FIG. 1 except that an upper magnetic pole layer 40 is composed of a first magnetic sub layer 40a adjoining the gap layer 20 and a second magnetic sub layer 40b.

The lower core layer 16, the lower magnetic pole layer 19, the gap layer 20, the insulating layer 23, and the upper core layer 22 are formed of the same materials described in FIGS. 1 and 2.

A magnetic pole 41 is composed of the lower magnetic pole layer 19, the gap layer 20, and the upper magnetic pole layer 40 consecutively formed by plating.

At least the first magnetic sub layer 40a, which adjoins the gap layer 20, of the two magnetic sub layers 40a and 40b is formed of at least one soft magnetic material selected from the group consisting of NiFe, CoFe, FeCoNi, CoFeX, and FeNiX, wherein X is at least one element selected from the group consisting of Pd, Ir, Rh, Ru, and Pt. The soft magnetic material contains at least 60 mass % of Fe, and preferably at least 70 mass % of Fe.

The second magnetic sub layer 40b may be formed of the same soft magnetic material as the first magnetic sub layer 40a or a soft magnetic material having a different composition.

Preferably, the first magnetic sub layer 40a is formed of a soft magnetic material having a saturation magnetic flux density higher than that of the second magnetic sub layer 40b.

The magnetic pole 41 may be composed of only the upper magnetic pole layer 40. The upper magnetic pole layer 40 may comprise three layers or more.

The width of the magnetic pole 41 in the track width direction (the X direction in the drawing) is the track width Tw.

The track width Tw is in the range of 0.1 to 0.8 μm, and preferably of 0.1 to 0.5 μm.

The upper core layer 22 is magnetically coupled with the second magnetic sub layer 40b. Preferably, the second magnetic sub layer 40b is formed of a soft magnetic material having a saturation magnetic flux density higher than that of the upper core layer 22.

In the magnetic pole 41, the ratio of the height H3 to the width Tw in the track width direction of the end face opposing a recording medium is in the range of 3.1 to 40.0.

In addition, the difference between the maximum Fe content and the minimum Fe content of the first magnetic sub layer 40a within 0.3 μm from the interface with the gap layer 20 is 6 mass % or less.

When the height of the first magnetic sub layer 40a is 0.3 μm or less, the difference between the maximum Fe content and the minimum Fe content of the interior of the first magnetic sub layer 40a is 6 mass % or less.

Preferably, the difference between the maximum Fe content and the minimum Fe content of the first magnetic sub layer 40a within 0.5 μm from the interface with the gap layer 20 is 6 mass % or less. More preferably, the difference between the maximum Fe content and the minimum Fe content within 1.0 μm from the interface with the gap layer 20 is 6 mass % or less.

By controlling the Fe content of the first magnetic sub layer 40a, the saturation magnetic flux density can be stable in the vicinity of the gap layer 20, and therefore the writing performance of the magnetic head can be improved while the recording density is being increased.

Figure 5:
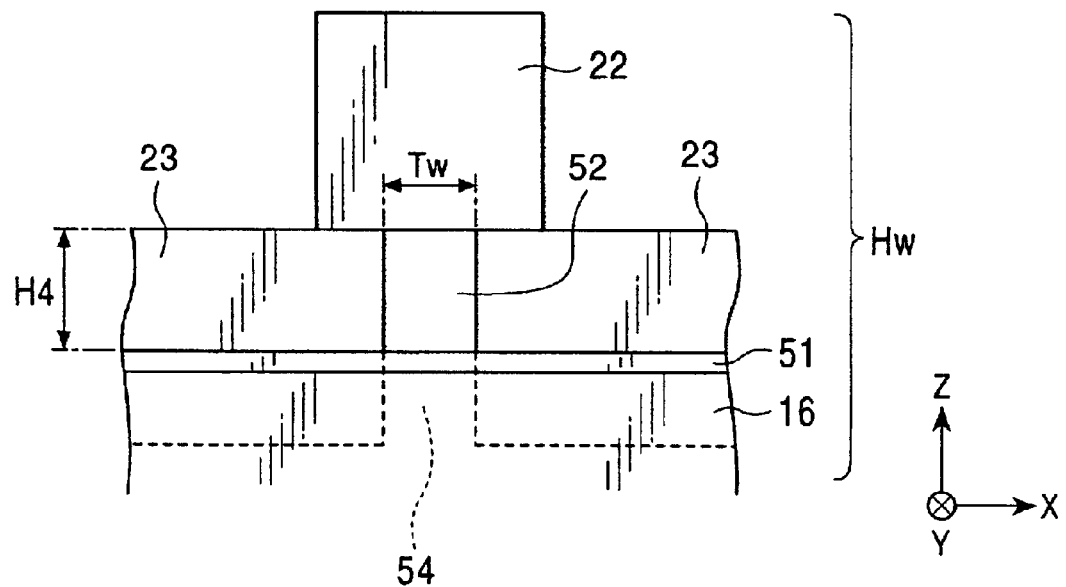
FIG. 5 is a fragmentary front view of a magnetic head according to a fourth embodiment of the present invention.

FIG. 5 shows a structure of an inductive head according to a fifth embodiment of the present invention.

A gap layer 51 is formed of an insulating material such as $Al_2O_3$ or $SiO_2$ on the lower core layer 16. The gap layer 51 is provided with an upper magnetic pole layer 52 formed of a soft magnetic material. The width of the upper magnetic pole layer 52 in the track width direction defines the track width Tw.

The track width Tw is in the range of 0.1 to 0.8 μm, and preferably of 0.1 to 0.5 μm.

The insulating layer 23 is formed on the top surface of the gap layer 51, on both sides of the upper magnetic pole layer 52, and at back of the upper magnetic pole layer 52 in the height direction. The upper core layer 22 is disposed on the upper magnetic pole layer 52. The upper magnetic pole layer 52 is magnetically coupled with the upper core layer 22. The lower core layer 16, the insulating layer 23, the upper core layer 22 are formed of the same materials as in the inductive head shown in FIG. 1.

The upper magnetic pole layer 52 is formed of at least one soft magnetic material selected from the group consisting of NiFe, CoFe, FeCoNi, CoFeX, and FeNiX, wherein X is at least one element selected from the group consisting of Pd, Ir, Rh, Ru, and Pt. In this embodiment of the present invention, the soft magnetic material contains at least 60 mass % of Fe, and preferably at least 70 mass % of Fe.

In the upper magnetic pole layer 52, the ratio of the height H4 to the width Tw in the track width direction of the end face opposing a recording medium is in the range of 3.1 to 40.0.

Since the upper magnetic pole layer 52 contains at least 60 mass % of Fe, the saturation magnetic flux density becomes higher in the vicinity of the gap layer 51 and therefore the magnetic flux can be concentrated in the vicinity of the gap layer. Also, the upper magnetic pole layer 52 has a large height at the end face thereof opposing a recording medium, and accordingly, the track width Tw can be small.

In addition, the difference between the maximum Fe content and the minimum Fe content of the upper magnetic pole layer 52 within 0.3 μm from the interface with the gap layer 51 is 6 mass % or less.

When the height H4 of the upper magnetic pole layer 52 is 0.3 μm or less, the difference between the maximum Fe content and the minimum Fe content of the interior of the upper magnetic pole layer 52 is 6 mass % or less.

Preferably, the difference between the maximum Fe content and the minimum Fe content of the upper magnetic pole layer 52 within 0.5 μm from the interface with the gap layer 51 is 6 mass % or less. More preferably, the difference between the maximum Fe content and the minimum Fe content within 1.0 μm from the interface with the gap layer 51 is 6 mass % or less.

By controlling the Fe content of the upper magnetic pole layer 52, the saturation magnetic flux density can be stable in the vicinity of the gap layer 51, and therefore the writing performance of the magnetic head can be improved while the recording density is being increased.

As indicated by the doted line in FIG. 5, a lower magnetic pole layer 54 may be formed by removing the gap layer 51 and the lower core layer 16 on both sides of the upper magnetic pole layer 52.

The upper magnetic pole layers 21, 34, 40, and 52 and the lower magnetic pole layers 19 and 32 may be formed of a soft magnetic material represented by $Ni_{1-x}Fe_x$ having a mean crystalline grain size of 105 Å or less and a Fe content x in the range of 60 to 75 mass %.

Alternatively, they may be formed of a soft magnetic material represented by $Ni_{1-x}Fe_x$ having a mean crystalline grain size in the range of 130 to 175 Å and a Fe content x in the range of 70 to 90 mass %. By performing electroplating with such a soft magnetic material, the crystalline grain size of the NiFe alloy can be controlled. Thus, the saturation magnetic flux density can be 1.9 T or more and the coercive force can be limited to 553 A/m or less.

Furthermore, the specific resistance of the NiFe alloy can be in the range of 30 to 50 μΩ·cm.

A method for manufacturing an inductive head Hw will now be described with reference to FIGS. 6 to 11.

Figure 6:
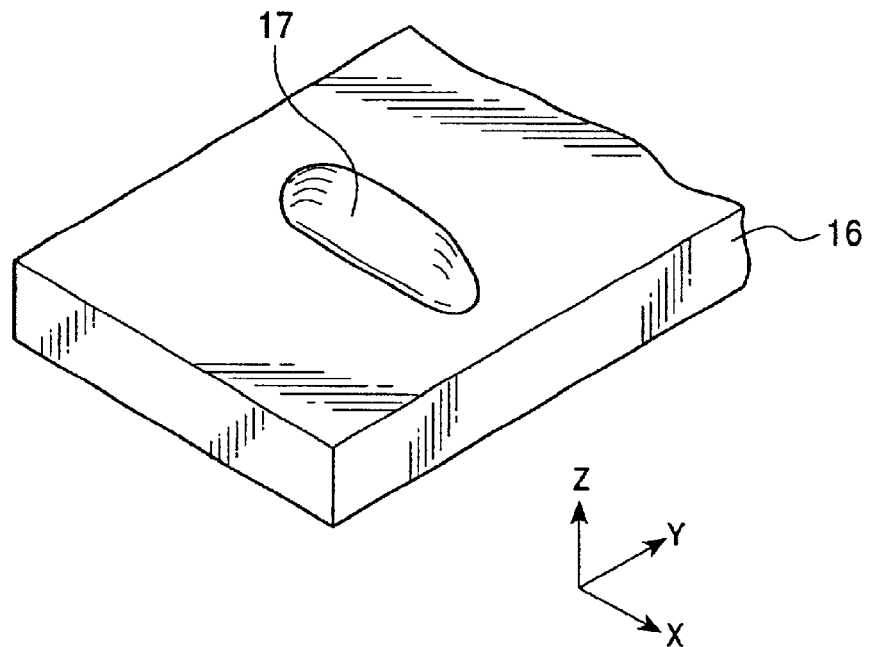
FIG. 6 is a drawing showing a step of manufacturing the magnetic head shown in FIGS. 1 and 2.

In FIG. 6, the lower core layer 16 is provided with a plated underlayer (not shown) formed of a magnetic material, such as permalloy. The Gd defining layer 17 is formed, on a predetermined area of the plated underlayer, of a nonmagnetic organic insulating resist, a nonmagnetic inorganic insulating material, such as $Al_2O_3$ or $SiO_2$, or a nonmagnetic conductive material, such as Cu.

When the Gd defining layer 17 is formed of a resist, the resist is formed into a rectangular shape, and then is subjected to post baking (a heat treatment) to cause curtaining. The resist is formed into a slope, which will be the front end face of the Gd defining layer 17, gradually inclining in the height direction (the Y direction) from the lower core layer 16 upward (the Z direction). After the post baking, the resist is exposed to ultraviolet light to be hardened, and thus the Gd defining layer 17 is formed.

Figure 7:
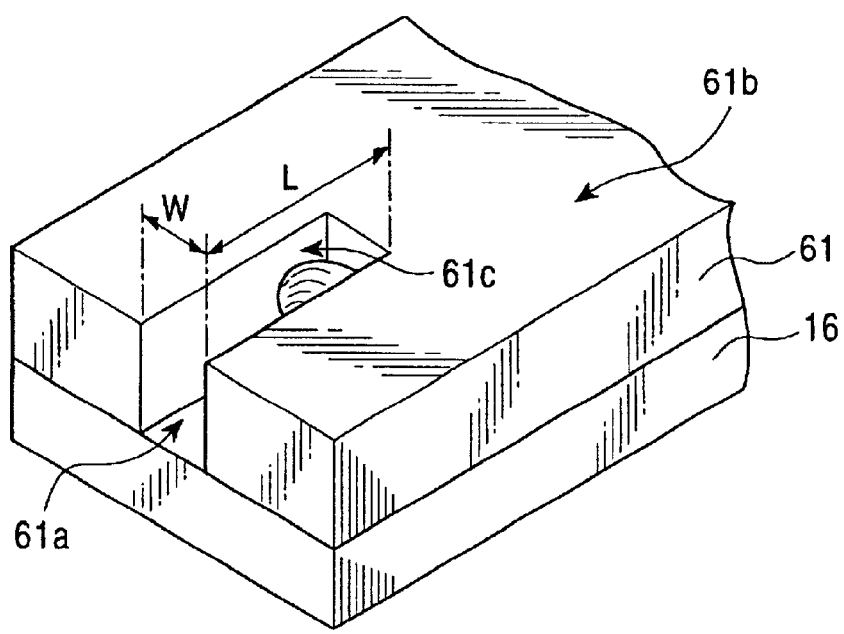
FIG. 7 is a drawing showing a step of manufacturing the magnetic head shown in FIGS. 1 and 2.

Next, as shown in FIG. 7, a resist layer 61 is applied on the lower core layer 16 and a slit 61a is formed in the resist layer 61 from the face opposing a recording medium in the height direction by light exposure or anisotropic etching. The width W of the slit 61a is in the range of 0.1 to 0.8 μm. Preferably, the width W is in the range of 0.1 to 0.5 μm. The resist layer 61 defines the magnetic pole in the present invention. The slit 61a may be formed to a width in the range of 0.3 to 0.8 μm. In this instance, the sides of a magnetic pole are cut away by, for example, ion milling so that the width of the magnetic pole is in the range of 0.1 to 0.8 μm.

The length L of the slit 61a is the same as or larger than the gap depth of the inductive head Hw.

The thickness of the resist layer 61 is in the range of 4 to 6 μm. In the anisotropic etching, reactive ion etching (RIE) may be used.

The slit 61a formed by anisotropic etching is cut perpendicular to a surface 61b of the resist layer 61 so that the angle between the side 61c of the slit 61a and the surface 61b of the resist layer 61 is in the range of about 83 to 90°.

Next, the lower magnetic pole layer 19 is formed of NiFe in the slit 61a by electroplating using a pulsed current. The lower magnetic pole layer 19 is electrically coupled with the lower core layer 16.

By forming the lower magnetic pole layer 19 by electroplating using a pulsed current, the total amount of charge supply can be limited while the maximum amount of charge supply per second (current) is being increased. Consequently, the current is sufficiently supplied, so that the current density in the slit 61a can be uniform while the current prevents a burnt deposit from occurring. Thus, the lower magnetic pole layer 19 can be formed substantially in a plane without bending.

The lower magnetic pole layer 19 may be formed of the same magnetic material as or different from the lower core layer 16.

The lower magnetic pole layer 19 is plated with the gap layer 20 in slit 61a.

Since the gap layer 20 is very thin, the gap layer 20 is hardly curved even by electroplating using a direct current. In order to save labor such as switching, preferably, pulsed current is used.

By forming the lower magnetic pole layer 19 by electroplating using a pulsed current, bending of the lower magnetic pole layer 19 can be prevented and thus bending of the gap layer 20 also can be prevented.

The lower magnetic pole layer 19 is not necessary and the lower core layer 16 may be directly plated to form the gap layer 20.

In this embodiment, the gap layer 20 is formed of at least one nonmagnetic metal selected from the group consisting of NiP, NiPd, NiPt, NiRh, NiW, NiMo, Au, Pt, Rh, Pd, Ru, Cr, Ag, and Cu. The gap layer 20 may be a monolayer or a multilayer.

The gap layer 20 is plated, in the slit 61a, with, for example, NiFe to form the upper magnetic pole layer 21. The upper magnetic pole layer 21 will be magnetically coupled with the upper core layer 22. The material of the upper magnetic pole layer 21 may be the same as or different from that of the upper core layer 22. Preferably, the upper magnetic pole layer 21 is formed of a soft magnetic material having a saturation magnetic flux density higher than that of the upper core layer 22.

In this embodiment, the upper magnetic pole layer 21 is formed by electroplating in which the density of impressed current is increased every predetermined period of time.

Specifically, the density of impressed current is set small in the vicinity of the bottom of the slit 61a, where the plating composition is unstably supplied from a plating bath, so that the plating composition becomes uniform. Then, the density of the impressed current is gradually increased to increase plating speed. By increasing the density of the impressed current every predetermined period of time, the upper magnetic pole layer 21 having a uniform composition can be formed.

As a result, the vicinity of the gap layer 20 can have a stable saturation magnetic flux density, and thus the writing performance of the magnetic head can be improved while the recording density is being increased.

Furthermore, a pulsed current is used as impressed current to form the upper magnetic pole layer 21 in the embodiment and the density of the pulsed current is increased every predetermined period of time.

Figure 12:
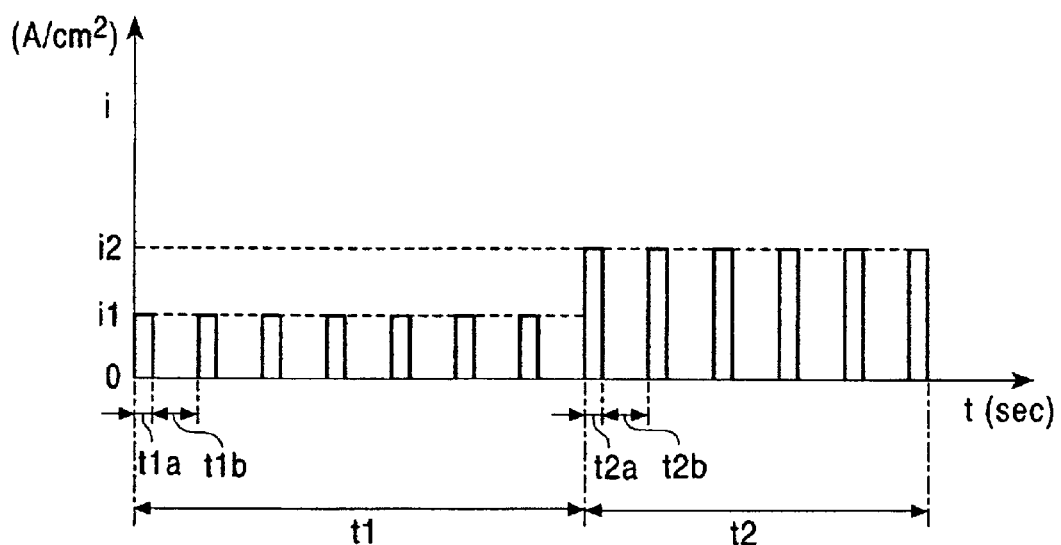
FIG. 12 is an exemplary timing chart of impressed current applied to form an upper magnetic pole layer by plating according to the present invention.

FIG. 12 is a timing chart of impressed current used in the embodiment. FIG. 12 shows that a pulsed current having an on-state current density of $i_1$ A/cm$^2$ and having an on-state for $t_{1a}$ seconds and an off-state for $t_{1b}$ seconds is applied for $t_1$ seconds and then a pulsed current having an on-state current density of $i_2$ A/cm$^2$ and having an on-state for $t_{2a}$ seconds and an off-state for $t_{2b}$ seconds is applied for $t_2$ seconds, wherein, for example, $i_1$=0.07 A/cm$^2$, $i_2$=0.15 A/cm$^2$, $t_{1a}$=0.3 s, $t_{1b}$=0.7 s, $t_1$=60 s, $t_{2a}$=0.3 s, $t_{2b}$=0.7 s, and $t_2$=60 s.

The upper magnetic pole layer 21 is formed to a thickness of 0.3 to 1 μm while the pulsed current is applied for $t_1$ seconds.

The conditions for applying pulsed current affect the mean crystalline grain size and the center line average roughness Ra of NiFe alloys.

In electroplating using a pulsed current, the current is intermittently applied by, for example, repeating on-off control by a current controlling device. By setting a pause time for applying no current, a NiFe alloy film can be gradually deposited, and further, the deviation of the current densities at plating can be alleviated in comparison with plating using a direct current even when the Fe concentration in the plating bath is increased. Thus, the Fe content of the soft magnetic material forming an upper magnetic pole layer can be increased in comparison with plating using a direct current.

The upper magnetic pole layer 21 contains at least 60 mass % of Fe in the present invention, and preferably the upper magnetic pole layer 21 is formed as a soft magnetic layer containing at least 70 mass % of Fe.

An Fe content in the range of 60 to 90 mass % results in a soft magnetic layer having a saturation magnetic flux density in the range of 1.6 to 2.1 T.

As the Fe content of the soft magnetic layer becomes larger beyond 60 mass %, the saturation magnetic flux density increases, and finally reaches the maximum value of 2.1 T when the Fe content becomes 80 mass %. The saturation magnetic flux density is substantially constant, that is 2.1 T, even if the Fe content is increased to more than 80 mass %. An Fe content of the soft magnetic layer in the range of 60 to 80 mass %, therefore, leads to a saturation magnetic flux density in the range of 1.6 to 2.1 T.

Also, an Fe content of the soft magnetic layer in the range of 67 to 80 mass % leads to a saturation magnetic flux density in the range of 1.8 to 2.1 T.

Furthermore, an Fe content of the soft magnetic layer in the range of 70 to 80 mass % leads to a saturation magnetic flux density of 1.9 to 2.1 T.

By forming the upper magnetic pole layer 21 of a NiFe alloy by electroplating using a pulsed current, the NiFe alloy can have a mean crystalline grain size of 105 Å or less and an Fe content in the range of 60 to 75 mass %.

By using the following plating composition (1) to form a NiFe layer, the NiFe layer can have a mean crystalline grain size in the range of 130 to 175 Å and a Fe content in the range of 70 to 90 mass %.

(1) Ni ion concentration is in the range of 6.6 to 20 g/L; and the Fe/Ni ion concentration ratio is in the range of 0.15 to 0.36.

As a result, the Ni ion concentration in the plating solution in contact with the surface of the cathode, which is plated, can be reduced, and therefore, the Fe deposition efficiency is improved and thus the Fe content of the NiFe alloy can be increased.

By reducing the Ni ion concentration to ensure the above-described concentration ratio, the mean crystalline grain size of the NiFe alloy can be controlled to ensure a high saturation magnetic flux density and a low coercive force. Also, the film stress as well as the center line average roughness Ra of the film can be reduced.

By using a plating bath having the composition (1), a NiFe layer having a Fe content in the range of 76 to 90 mass % or a NiFe layer having a mean crystalline grain size in the range of 130 to 175 Å and a Fe content in the range of 70 to 90 mass % can be formed with a good repeatability.

When the Ni ion concentration is 10 g/L or more, the Fe/Ni ion concentration ratio is preferably in the range of 0.2 to 0.35.

Thus, the NiFe alloy can have a Fe content in the range of 76 to 90 mass % or the NiFe alloy can have a mean crystalline grain size in the range of 130 to 175 Å and a Fe content in the range of 70 to 90 mass % with a good repeatability.

On the other hand, when the Ni ion concentration is 10 g/L or less, the Fe/Ni ion concentration ratio is preferably in the range of 0.15 to 0.36. Thus, the NiFe alloy can have a Fe content in the range of 76 to 90 mass % or the NiFe alloy can have a mean crystalline grain size in the range of 130 to 175 Å and a Fe content in the range of 70 to 90 mass % with a good repeatability.

When the Ni ion concentration is 10 g/L or less, the Fe/Ni ion concentration ratio is in the range of 0.15 to 0.36 and is wider than that when the Ni ion concentration is 10 g/L or more. A Ni ion concentration of 10 g/L or less is therefore preferable to readily control the Fe/Ni ion concentration ratio.

Preferably, sodium saccharin ($C_6H_4CONNaSO_2$) is added to the plating bath to serve as a stress alleviator, thereby lowering the film stress of the NiFe alloy.

Preferably, the plating bath contains 2-butyne-1,4-diol to prevent the NiFe alloy from having a large crystalline grain size and thus to reduce the coercive force.

Preferably, the plating bath contains sodium 2-ethylhexyl sulfate.

Sodium 2-ethylhexyle sulfate serves as a surfactant. By adding sodium 2-ethylhxyle sulfate, the formation of a rough film surface can be inhibited and the coercive force can be reduced.

Sodium lauryl sulfate may be used instead of sodium 2-ethylhexyl sulfate.

Preferably, boric acid is added to the plating bath to serve as a pH buffer agent on the electrode surface and to effectively gloss the plated film.

The upper magnetic pole layer 21, which is included in the magnetic pole 18, is formed such that the ratio of the height H5 to the width W in the track width direction of the end face of the magnetic pole 18 opposing a recording medium is in the range of 5.0 to 20.0.

The upper magnetic pole layer 21 must have a large volume to rarely cause magnetic saturation. Accordingly, the upper magnetic pole layer 21 is large in the height direction in the slit 61a.

Since, in the present invention, the upper magnetic pole layer 21 is formed by electroplating in which the density of the impressed current is increased every predetermined period of time, the upper magnetic pole layer 21 can have a uniform soft magnetic composition.

Specifically, the upper magnetic pole layer 21 can be formed of a NiFe alloy by plating such that the difference between the maximum Fe content and the minimum Fe content thereof within 0.3 $\mu$m from the interface with the gap layer 20 is 6 mass % or less. Furthermore, the difference between the maximum Fe content and the minimum Fe content can be 5 mass % or less.

FIG. 12 is a timing chart of a pulsed current used for electroplating in which the density of the impressed current is increased by a single step.

The density of the pulsed current may be increased by 2 steps or more in the electroplating.

Figure 13:
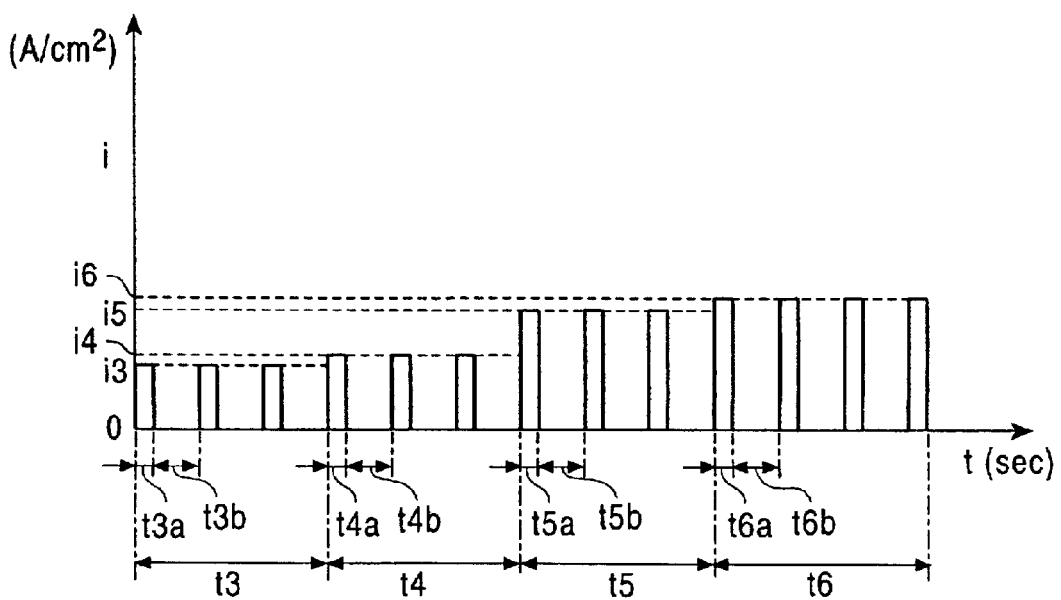
FIG. 13 is an exemplary timing chart of impressed current applied to form an upper magnetic pole layer by plating according to the present invention.
Figure 14:
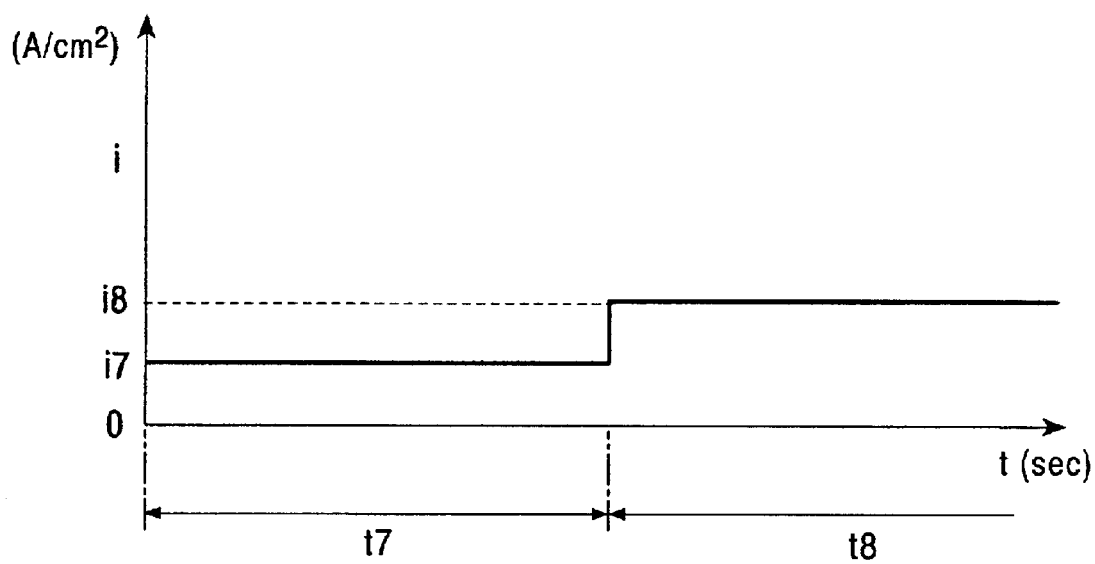
FIG. 14 is an exemplary timing chart of impressed current applied to form an upper magnetic pole layer 8 by plating according to the present invention.

FIG. 13 is a timing chart of a pulsed current in which the density of the impressed current is increased by three steps in electroplating. FIG. 13 shows that a pulsed current having an on-state current density of $i_3$ A/cm$^2$ and having an on-state for $t_{3a}$ seconds and an off-state for $t_{3b}$ seconds is applied for $t_3$ seconds; a pulsed current having an on-state current density of $i_4$ A/cm$^2$ and having an on-state for $t_{4a}$ seconds and an off-state for $t_{4b}$ seconds is applied for $t_4$ seconds; a pulsed current having an on-state current density of $i_5$ A/cm$^2$ and having an on-state for $t_{5a}$ seconds and an off-state for $t_{5b}$ seconds is applied for $t_5$ seconds; and a pulsed current having an on-state current density of $i_6$ A/cm$^2$ and having an on-state for $t_{6a}$ seconds and an off-state for $t_{6b}$ seconds is applied for $t_6$ seconds.

For example: $i_3$=0.07 A/cm$^2$, $i_4$=0.10 A/cm$^2$, $i_5$=0.11 A/cm$^2$, $i_6$=0.12 A/cm$^2$, $t_{3a}$=0.3 s, $t_{3b}$=0.7 s, $t_3$=5 s, $t_{4a}$=0.3 s, $t_{4b}$=0.7 s, $t_4$=60 s, $t_{5a}$=0.3 s, $t_{5b}$=0.7 s, $t_5$=60 s, $t_{6a}$=0.3 s, $t_{6b}$=0.7 s, and $t_6$=60 s.

Figure 17:
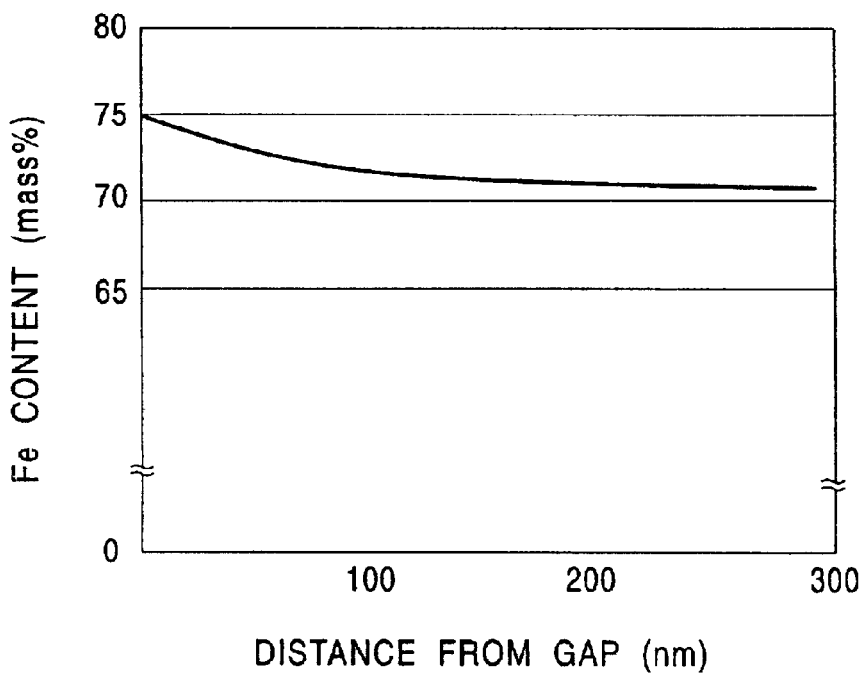
FIG. 17 is an Fe content distribution of an upper magnetic pole layer.
Figure 18:
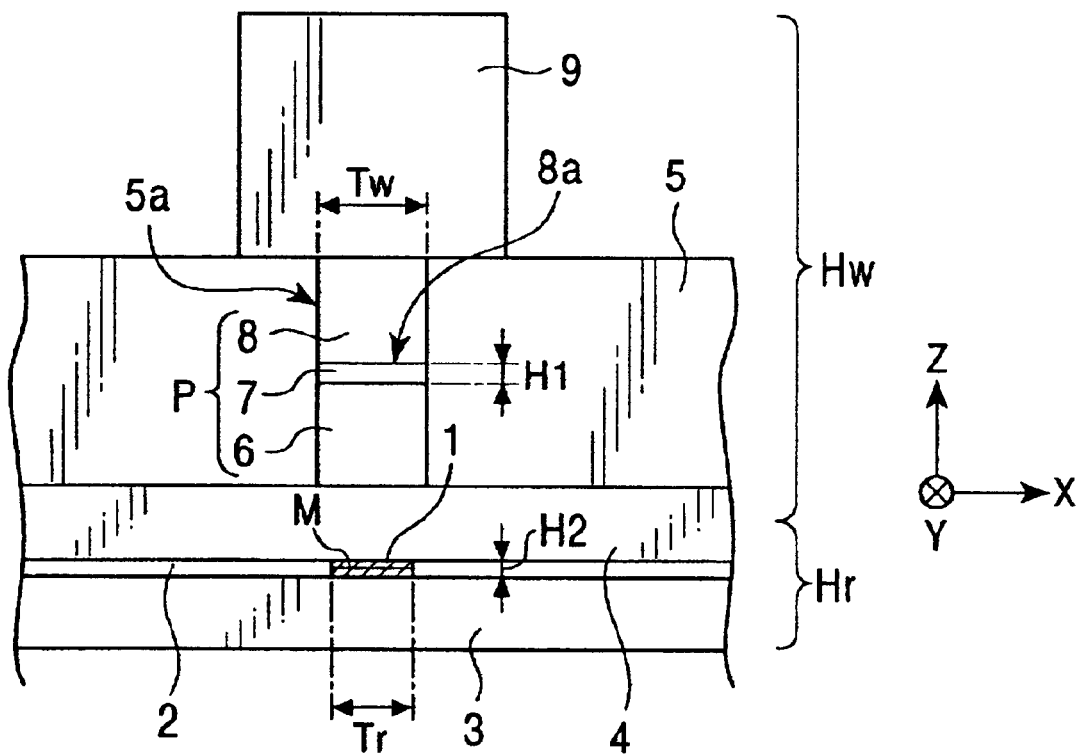
FIG. 18 is a front view of a known inductive head.

The density of impressed current may be increased every predetermined period of time to reduce the Fe supplying rate from the plating bath as the plated surface is moving away from the gap layer. As a result, the Fe content of the upper magnetic pole layer 21 can be increased as the plated surface is getting closer to the gap layer 20, as shown in FIG. 17.

In the present invention, the upper magnetic pole layer 21 is formed of a NiFe alloy. The upper magnetic pole layer 21 may be formed of at least one soft magnetic material selected from the group consisting of NiFe, CoFe, FeCoNi, CoFeX, and FeNiX, wherein X represents at least one element selected from the group consisting of Pd, Ir, Rh, Ru, and Pt.

When the upper magnetic pole layer 21 is formed of a CoFe alloy, electroplating may be used in which a direct current having a density of $i_7$ is applied for $t_7$ seconds and subsequently the density is increased to $i_8$ and is applied for $t_8$ seconds.

Figure 8:
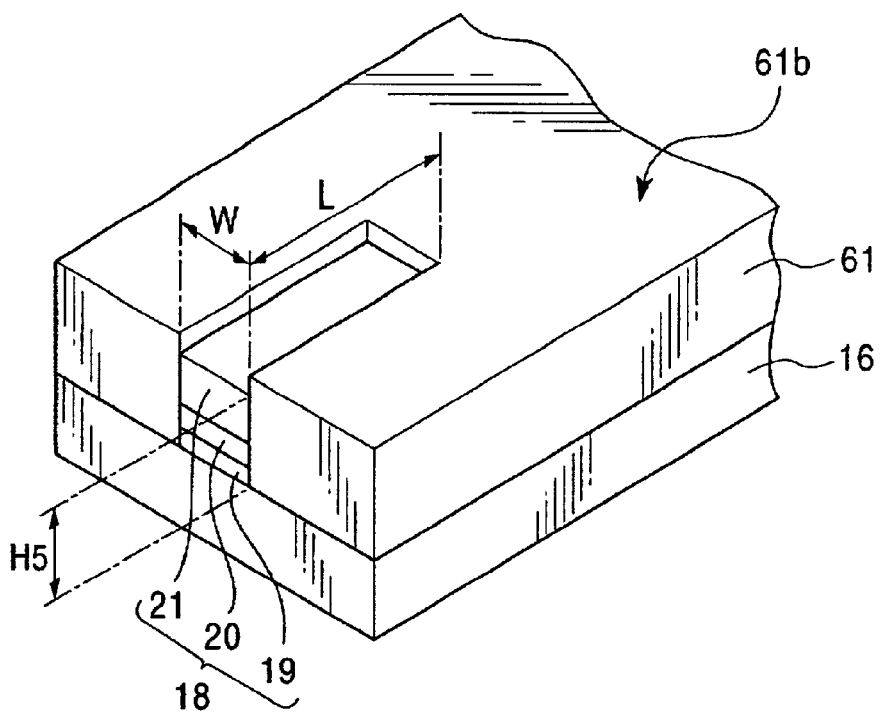
FIG. 8 is a drawing showing a step of manufacturing the magnetic head shown in FIGS. 1 and 2.

FIG. 8 shows a state when the lower magnetic pole layer 19, the gap layer 20, and the upper magnetic pole layer 21 are formed in the slit 61a. The height H5 of the magnetic pole 18 is substantially the same as the thickness of the resist layer 61 and is 4 to 6 μm.

Figure 9:
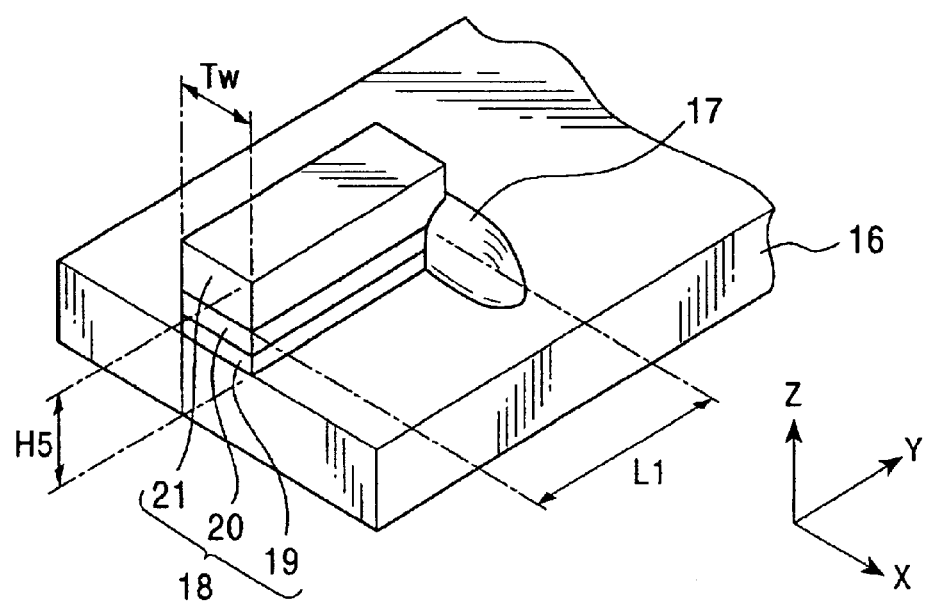
FIG. 9 is a drawing showing a step of manufacturing the magnetic head shown in FIGS. 1 and 2.

FIG. 9 shows a state after the resist layer 61 is removed. The lower magnetic pole layer 19, the gap layer 20, and the upper magnetic pole layer 21 are disposed in that order on the lower core layer 16 in the vicinity of the ABS face.

Both sides of the magnetic pole 18, which comprises the lower magnetic pole layer 19, the gap layer 20, and the upper magnetic pole layer 21, in the X direction is cut to reduce the width thereof by ion milling. The width of the upper magnetic pole layer 21 after ion milling defines the track width Tw. The track width Tw is in the range of 0.1 to 0.8 μm and preferably is in the range of 0.1 to 0.5 μm.

Figure 10:
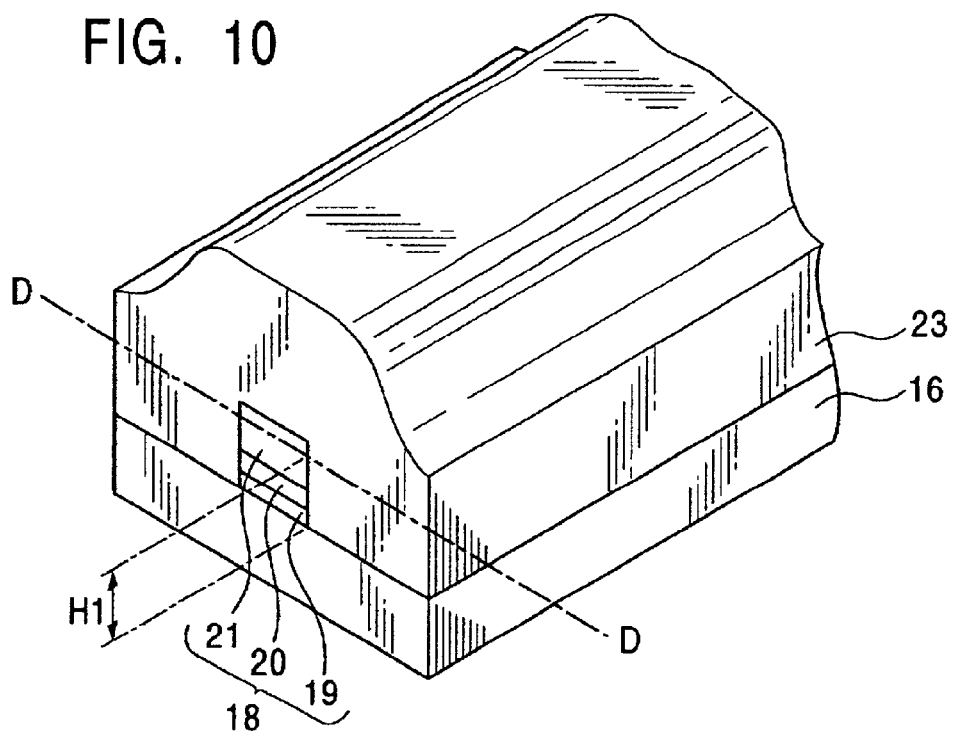
FIG. 10 is a drawing showing a step of manufacturing the magnetic head shown in FIGS. 1 and 2.

FIG. 10 shows a step of forming the insulating layer 23 from the top surface of the upper magnetic pole layer 21 to the top surface of the lower core layer 16 by sputtering.

The insulating layer 23 is formed of at least one material selected from the group consisting of AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN. The insulating layer 23 may be a monolayer or a multilayer.

Figure 11:
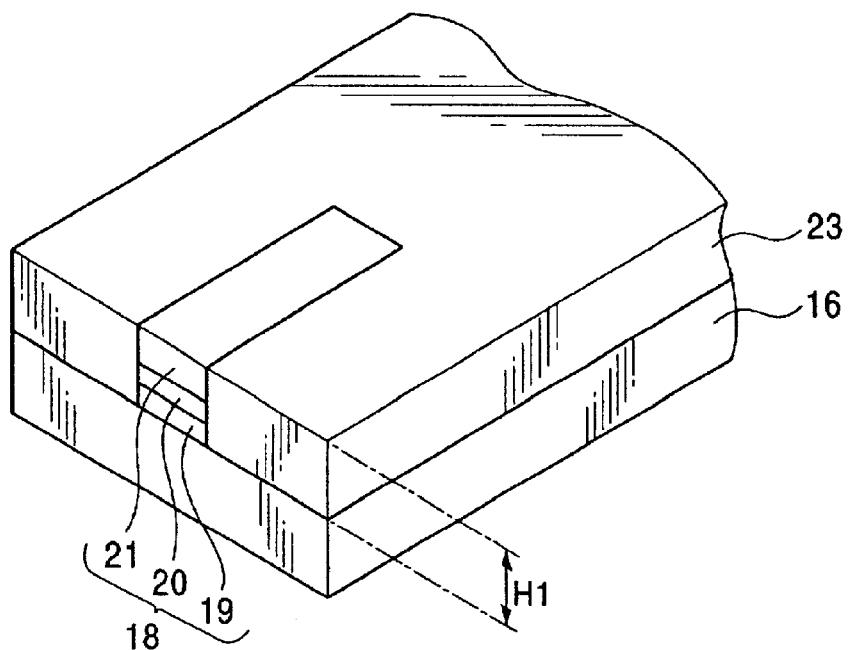
FIG. 11 is a drawing showing a step of manufacturing the magnetic head shown in FIGS. 1 and 2.

The top surface of the insulating layer 23 is removed up to the line D-D by Chemical Mechanical Polishing (CMP) or the like. FIG. 11 shows a state after the removal.

By removing the top surface of the insulating layer 23, as shown in FIG. 11, the top surface of the upper magnetic pole layer 21 is exposed. The thickness of the insulating layer 23 is the same as that of the magnetic pole 18 in FIG. 11, and is the same as the height H1 of the magnetic pole 18. In this instance, H1 is in the range of 2.5 to 4.0 μm.

After forming the upper magnetic pole layer 21, the coil layer (not shown) is formed on the insulating layer 23 extending in the height direction beyond the upper magnetic pole layer 21, and further, a coil insulating layer (not shown) is formed on the coil layer.

The upper core layer 22 is formed of a magnetic material, such as NiFe, by frame plating. The upper core layer 22 is magnetically coupled with the upper magnetic pole layer 21. The upper core layer 22 has a width larger than the track width Tw, as shown in FIG. 1.

The Gd defining layer 17 is inclined such that the front end face thereof moves away from the face opposing a recording medium as the end face extends upward from the lower core layer 16 in the Z direction. Thus, the upper magnetic pole layer 21 is extended over the Gd defining layer 17.

Thus, the upper core layer 22 on the upper magnetic pole layer 21 and the interface therebetween can have large areas and the upper magnetic pole layer 21 can have a large volume. As a result, the magnetic flux flowing from the upper core layer 22 is rarely restricted in the interface. Since the magnetic flux thus readily flows through the upper magnetic pole layer 21, it cannot be saturated before reaching the gap layer 20.

Hence, it is ensured that the leakage flux is generated from the gap layer 20 to perform accurate recording even when the recording frequency is increased.

In order to increase the leakage flux, the area of the gap layer 20 must be as small as possible. The length of the top surface of the gap layer 20 from the front face of the Gd defining layer 17 to the face opposing a recording medium (ABS face) is set at L1 in FIG. 9. The area of the gap layer 20, therefore, cannot become unnecessarily large.

The inductive head shown in FIG. 4 is also formed by the same procedure.

In the case of the inductive head shown in FIG. 3, the insulating layer 31 and the slit 31a are formed on the lower core layer 16, and the slopes 31c are formed by isotropic ion milling or the like. Then, the lower magnetic pole layer 32, the gap layer 33, and the upper magnetic pole layer 34 are formed in the slit 31a by plating successively.

In the case of the inductive head shown in FIG. 5, the gap layer 51 is formed on the lower core layer 16. After forming a plated underlayer (not shown) on the gap layer 51, a resist layer having a slit is formed and then the upper magnetic pole layer 52 is formed in the slit by plating.

The conditions of the plating for forming the upper magnetic pole layers 34 and 52 of the inductive heads shown in FIGS. 3 and 5 are the same as when the upper magnetic pole 21 of the inductive head shown in FIGS. 1 and 2 is formed larger.

The lower core layer 16, the lower magnetic pole layer 19, the gap layer 20, and the upper core layer 22 may be formed by electroplating in which the density of impressed current is increased every predetermined period of time.

The layer designated by reference numeral 16 serves as both a lower core layer and an upper shield layer in each embodiment of the present invention. The lower core layer and the upper shield layer may be each formed separately. In this instance, the lower core layer and the upper shield layer have an insulating layer therebetween.

EXAMPLE

The Fe content distribution in the upper magnetic pole layer 21 of the inductive head shown in FIGS. 1 and 2 was investigated.

The upper magnetic pole layer 21 was formed in the slit 61a of the resist layer 61, as shown in FIG. 8. The width W and the height of the slit 61a were 0.5 μm and 5 μm, respectively. The lower magnetic pole layer 19 and the gap layer 20 were formed in the slit 61a by plating. The gap layer was plated with a NiFe alloy to successively form the upper magnetic pole layer 21.

The plating bath contained:
1.6 to 2.4 g/L of Fe ion,
6.68 g/L of Ni ion,
2 g/L of sodium saccharin,
0.02 g/L of sodium lauryl sulfate,
25 g/L of boric acid, and
25 g/L of sodium chloride.

The temperature of the plating bath was set at 30° C. The pH of the electrodes including a Ni anode were set at 3.5.

The upper magnetic pole layer 21 was formed by electroplating using a pulsed current as an impressed current, in which the density of the pulsed current was increased every predetermined period of time.

In this example, a pulsed current as shown in FIG. 11 was used, wherein $i_1=0.07$ A/cm$^2$, $i_2=0.15$ A/cm$^2$, $t_{1a}=t_{2a}=0.3$ s, $t_{1b}=t_{2b}=0.7$ s, $t_1=30$ s, and $t_2=120$ s.

Figure 15:
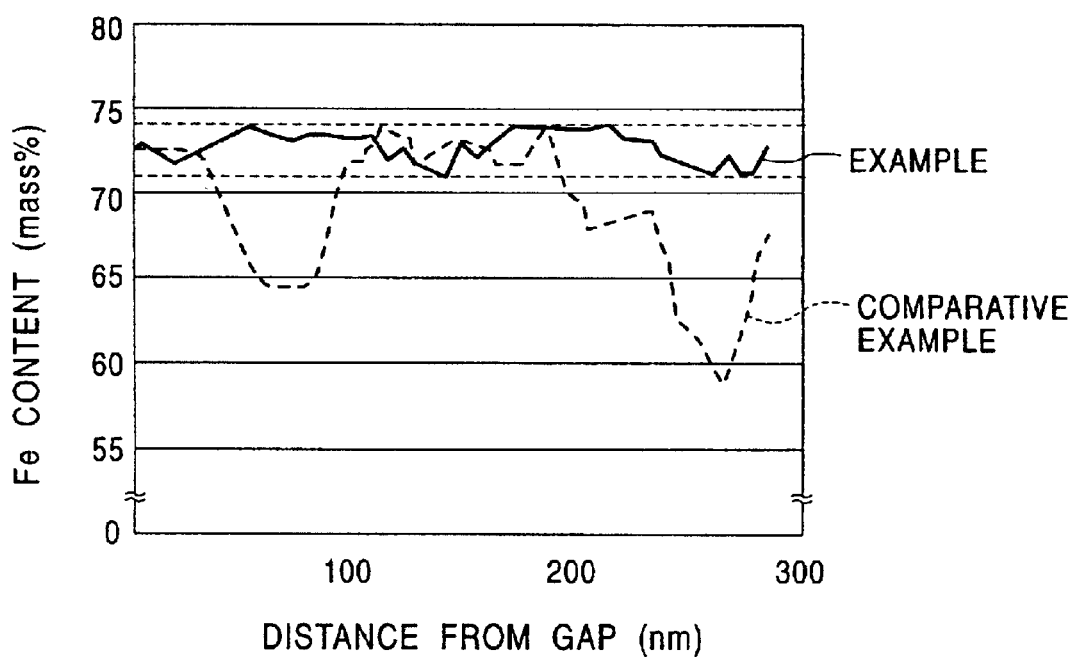
FIG. 15 is an Fe content distribution of the interior of an upper magnetic pole layer of the magnetic head shown in FIGS. 1 and 2.

After the upper magnetic pole layer 21 was formed, the relationship between the distance from the under surface 21a of the upper magnetic pole layer 21 in the Z direction and the Fe content in the upper magnetic pole layer 21 was measured. The measurement was performed by energy dispersive characteristic X-ray spectroscopic analysis (EDS) using a transmission electron microscope (TEM). FIG. 15 shows the results.

Figure 19:
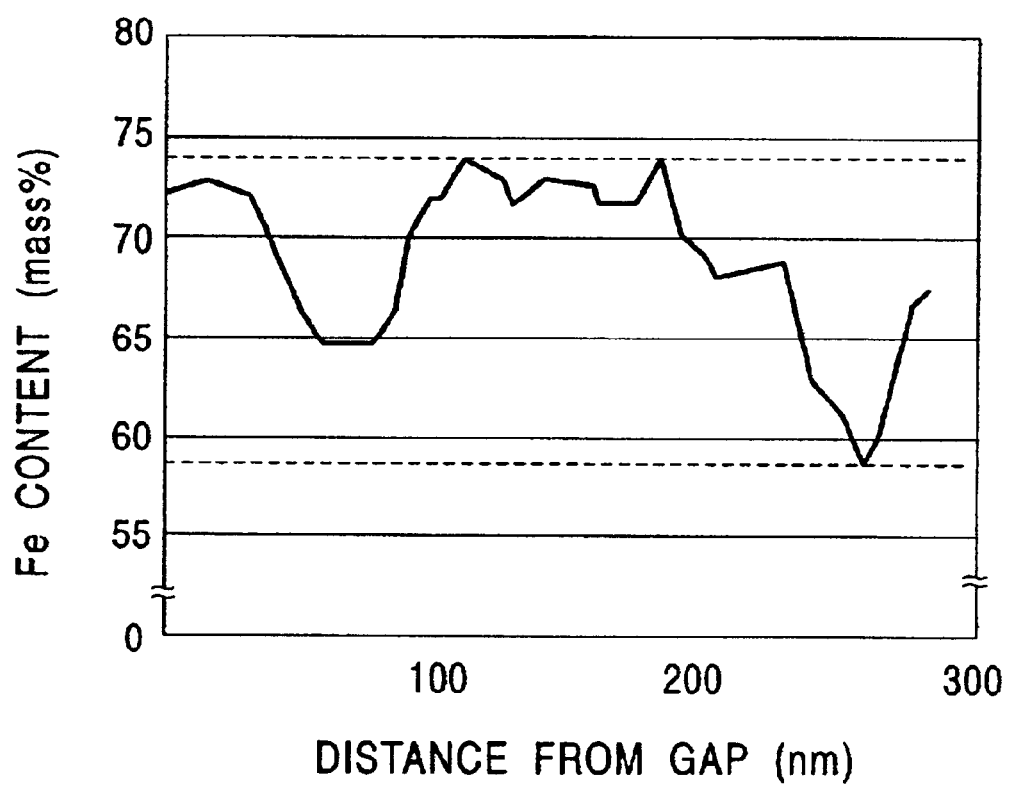
FIG. 19 is an Fe content distribution of the interior of an upper magnetic pole layer of a known inductive head.

The chain line in FIG. 15 shows the Fe content distribution in the upper magnetic pole layer shown in FIG. 19 for the sake of comparison.

FIG. 15 suggests that the Fe content of the NiFe upper magnetic pole layer 21 within 0.30 μm from the under surface thereof (the interface with the gap layer) is in the range of 71 to 74 mass %.

The Fe content of the upper magnetic pole layer 21 is ensured to be 60 mass % or more and the difference between the maximum Fe content and the minimum Fe content is 3 mass %.

Also, the height H1 and the width Tw in the track width of the end face of magnetic pole 18 opposing a recording medium was 2.5 μm and 0.4 μm, respectively, after the CMP process shown in FIG. 10; hence, the ratio of the height H1 to the width Tw is 6.3.

Figure 16:
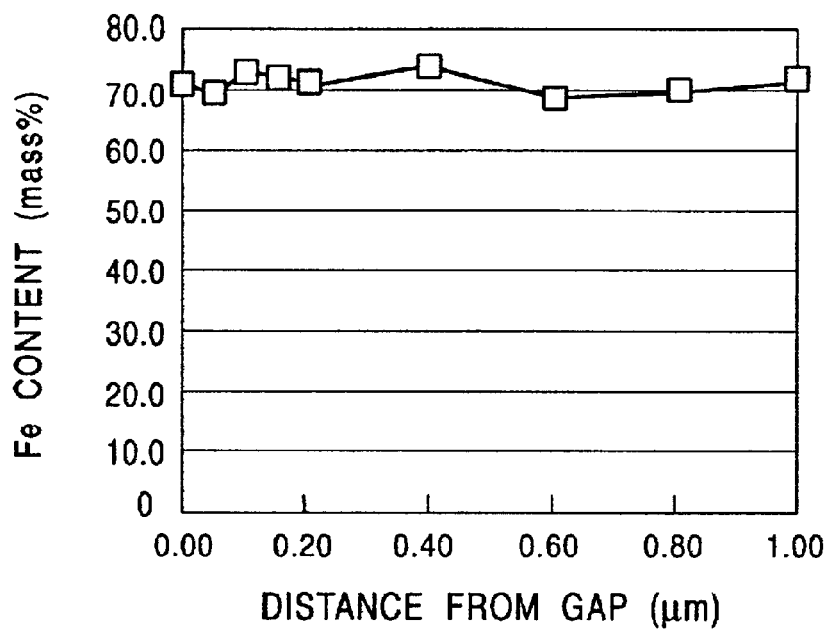
FIG. 16 is an Fe content distribution of the interior of an upper magnetic pole layer of the magnetic head shown in FIGS. 1 and 2.

FIG. 16 shows changes in the Fe content of the NiFe upper magnetic pole layer 21 within 1.00 μm from the under surface 21a thereof in the Z direction.

FIG. 16 suggests that the Fe content of the NiFe upper magnetic pole layer 21 within 0.50 μm from the under surface thereof is in the range of 70 to 74 mass % and that the Fe content of the NiFe alloy within 1.00 μm from the under surface thereof is in the range of 68 to 74 mass %.

The resulting magnetic head has an upper magnetic pole layer or a lower magnetic pole layer formed of a soft magnetic material containing at least 60 mass % of Fe. The difference between the maximum Fe content and the minimum Fe content of the upper magnetic pole layer or the lower magnetic pole layer within 0.3 μm from the interface with the gap layer is 6 mass % or less.

What is claimed is:

1. A magnetic head comprising:

a lower core layer;

an upper core layer;

a coil layer to apply a writing magnetic field to the lower core layer and the upper core layer; and a magnetic pole disposed between the lower core layer and the upper core layer, the magnetic pole having a width in a track width direction smaller than that of the lower core layer and the upper core layer, the magnetic pole one of comprising a lower magnetic pole layer adjoining the lower core layer, an upper magnetic pole layer adjoining the upper core layer, and a gap layer disposed between the lower magnetic pole layer and the upper magnetic pole layer, and comprising the upper magnetic pole layer adjoining the upper core layer and the gap layer disposed between the upper magnetic pole layer and the lower core layer;

wherein at least one of the upper magnetic pole layer and the lower magnetic pole layer comprises a soft magnetic material comprising at least 60 mass % of Fe, and a difference between a maximum Fe content and a minimum Fe content of the at least one of the upper magnetic pole layer and the lower magnetic pole layer within 0.3 μm from an interface with the gap layer is at most 6 mass %, and the Fe content in a cross section of the at least one of the upper magnetic pole layer and the lower magnetic pole layer increases towards an interface with the gap layer.

2. A magnetic head according to claim 1, wherein a ratio of a height to the width in the track width direction of an end face of the magnetic pole opposing a recording medium is in the range of 3.1 to 40.0.

3. A magnetic head according to claim 1, wherein the at least one of the upper magnetic pole layer and the lower magnetic pole layer comprises a soft magnetic material comprising at least 70 mass % of Fe.

4. A magnetic head according to claim 1, wherein the width in the track width direction of an end face of the magnetic pole opposing a recording medium is in the range of 0.1 to 0.8 μm.

5. A magnetic head according to claim 1, wherein the at least one of the upper magnetic pole layer and the lower magnetic pole layer comprises a soft magnetic material selected from the group consisting of NiFe, CoFe, FeCoNi, CoFeX, and FeNiX, wherein X represents at least one element selected from the group consisting of Pd, Ir, Rh, Ru, and Pt.

6. A magnetic head according to claim 1, wherein the upper magnetic pole layer comprises a soft magnetic material having a saturation magnetic flux density higher than that of the upper core layer.

* * * * *